April 9, 1957  S. R. PORWANCHER  2,788,411
CONTROL DEVICES
Filed Dec. 27, 1955
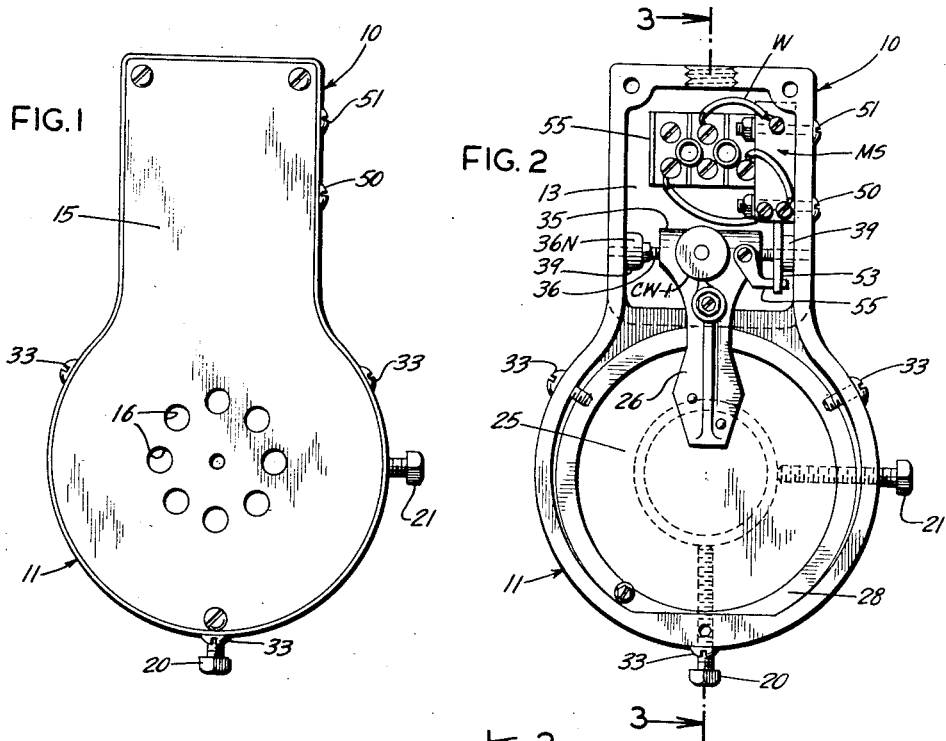
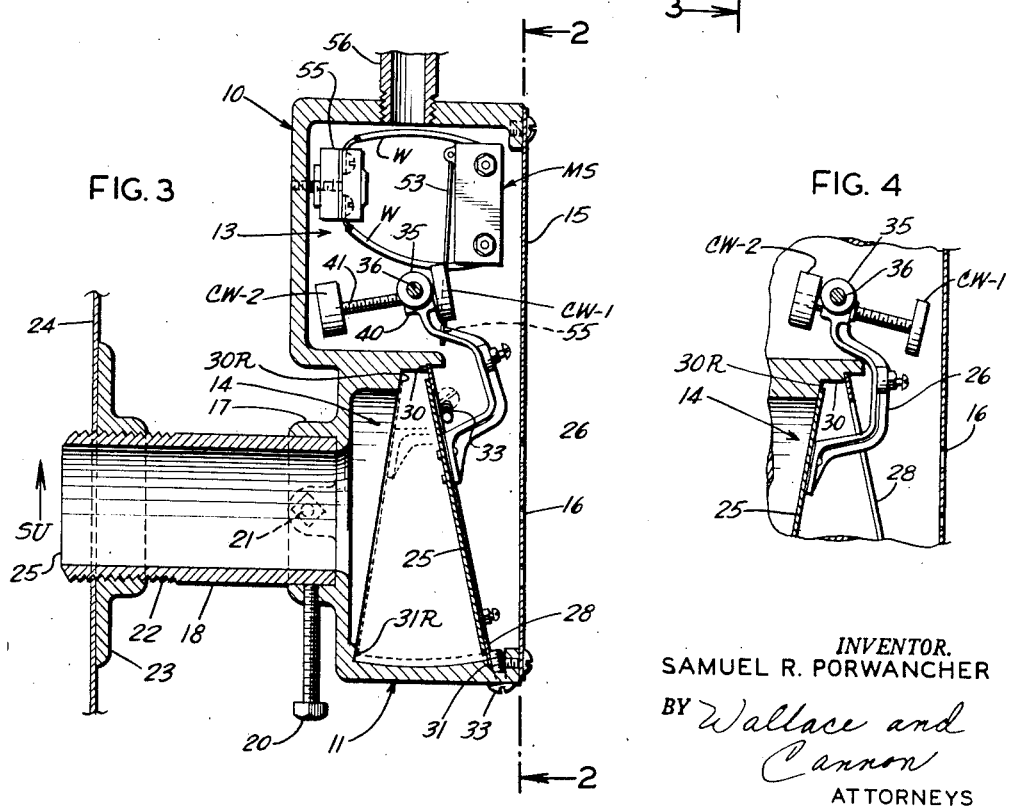
INVENTOR.
SAMUEL R. PORWANCHER
BY Wallace and Cannon
ATTORNEYS United States Patent Office 2,788,411
Patented Apr. 9, 1957

2,788,411

CONTROL DEVICES

Samuel R. Porwancher, Chicago, Ill., assignor to Drying Systems, Inc., Chicago, Ill., a corporation of Illinois Application December 27, 1955, Serial No. 555,437

5 Claims. (Cl. 200—81.5)

This invention relates to a pressure-responsive control device responsive to changes in pressure of a body of fluid, and in particular the invention relates to a control device embodying a dually settable or reversible counterweight and a safety switch adapted to disable or otherwise assure the protection of equipment likely to be damaged in the event that fluid pressure in the system where such equipment has been installed fails to be maintained at normal or operating pressure.

In operating equipment such as heaters, blowers, ovens, dryers, and the like under circumstances where air or other fluid is to be maintained at a predetermined rate of flow or pressure, a protective device is usually associated with such equipment so as to sense the area in which the fluid is confined and disable the operating equipment or establish a warning signal in the event that the body of the fluid is at a pressure above or below that which is necessary for safe operation. For instance, devices of the foregoing kind usually embody a switch, and are used extensively in control circuits to close fuel valves to gas or oil burners in the event of fan failure or to disable the burner in case of draft failure, and in such circumstances are arranged to sense the air pressure in the air duct, either on the suction or pressure side. In like manner, such a device can be used to operate warning signals upon a change in fluid pressure on either side of a predetermined operating value, and it will be readily recognized from the foregoing that the abnormal condition sensed may result either in the establishment or breaking of a control circuit.

It is advantageous to be able quickly and easily to convert the control from one type of pressure operation to the other, that is, so that the control may be installed either for operation under suction or for operation in the presence of positive pressure, and so to do is the primary object of the present invention. Specifically in this connection, the object of the invention is to embody in the control a dually settable counterweight member having two counterweights thereon for setting the sensing element of the control in either one or the other of two idle positions that characterize the control as adapted, respectively, for suction or positive pressure operation.

In constructing such fluid responsive control devices, resort has been had to a mercury switch that is carried by a pivotally mounted sensing element, and hence accurate balancing is required if the switch is to be immediately responsive to the sensing of an undesired value of fluid pressure by the sensing element. In other words, difficulty has been entailed in arranging the mercury tube with respect to the pivotal support for the sensing element to assure an accurate relation between the responses of the sensing element and the concomitant tilt of the mercury tube to break or close the control circuit. Moreover, there are circumstances where there is danger of fracturing the mercury tube, and special precautions must be taken to overcome this; and in certain systems that are to be controlled in the aforesaid manner the presence of mercury is a detrimental factor, as for instance in the processing of photographic film.

Another object of the present invention is to overcome these objectionable features in pressure responsive control devices that heretofore have embodied a mercury control switch, and to do this in a control embodying a dually settable counterweight as described above.

Under the present invention, there is afforded a pressure responsive control comprising a sensing element under the control of one of two counterweights which can be reversed so as to convert the sensing element from one idle position to another, such idle positions corresponding to respectively different kinds of pressure operation. The control device also embodies a micro-switch which does not need to be accurately balanced on a fulcrum, and neither carried nor tilted by the sensing element during responses of the sensing element to a change in fluid pressure. As a consequence of this, the sensing element which is adapted to shift or move in response to change in fluid pressure does not have to overcome the inertia or dead weight of the control switch, and accordingly such increases the sensitivity of the control in ability to respond instantly to a change in fluid pressure. The micro-switch can be anchored in place adjacent the sensing means with the highly sensitive contact arm of the switch disposed in position to be controlled by and upon movement of the sensing element. Therefore, it is not necessary that the switch move with the sensing element, as in the instance of a conventional mercury tube switch, and the likelihood of the switch acquiring an improper position on a fulcrum due to repeated tilting is altogether eliminated. The foregoing advantages constitute further attained objects of the present invention.

Other and further objects of the present invention will be apparent from the following description and claims and are illustrated in the accompanying drawing which, by way of illustration, shows a preferred embodiment of the present invention and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a front elevation of a control constructed in accordance with the present invention;

Fig. 2 is a front elevation of the control similar to Fig. 1 but with the cover plate removed, being taken substantially at the line 2—2 of Fig. 3;

Fig. 3 is a sectional view taken on the line 3—3 of Fig. 2 with the counterweights at one setting; and Fig. 4 is a detail sectional view showing the counterweights in their other setting.

The present invention is illustrated in the drawing as embodied in a pressure responsive control 10 comprising a casting affording a main housing 11, and this housing is divided into an upper compartment or chamber 13 and a lower chamber 14, Fig. 3.

The housing 11 includes a removable cover plate 15 provided with apertures 16, so that by removing the cover plate access may be had to the interior of the housing enabling adjustments and alterations in the control to be affected for purposes that will be clear from the description to follow.

The control 10 is adapted to be disposed in the vertical position shown in the drawing to sense the pressure of a fluid body such as a moving stream of air, and to this end the portion of the housing 11 affording the lower chamber 14 is formed with a forwardly extending mounting boss 17 which affords communication between the lower chamber 14 and a nipple 18 anchored in the boss 17 by set screws as 20 and 21. The end of the nipple 18 that is opposite the boss 17 is threaded at 22, and threadedly mounted on this portion of the nipple 18 is a flange 23 which is adapted to be secured directly to the wall of a duct or like conduit 24 with the end 25 of the nipple exposed to the fluid therein. It will be observed further in Fig. 3 that the end 25 projects beyond the flange 23. This is merely to show such relation is afforded when the nipple 18 is to be mounted on a directional elbow of a duct, such elbow having threads complementary to the threads on the nipple 18.

In Fig. 3, the arrow SU indicates installation of the control 10 on the suction side of an intake air duct of a fan or blower, which is one operating condition for the control 10 so that suction is adapted to be established in the lower chamber 14. Such low pressure will likewise be established on the forward face of a two-position fluid pressure sensing element in the form of a thin aluminum disc or vane 25 that is disposed in the lower chamber 14 of the housing 11. The disc or vane 25 includes an upwardly extending bracket 26, and this bracket 26 at the upper end thereof is pivoted in a way to be described.

Prior to establishing conditions creating a suction in chamber 14, the disc 25 is held or biased in its idle position in a way to be described, against the rear face of a stop element in the form of an annular ring 28. The ring 28 is disposed at an angle in the chamber 14 of the housing 11, as will be observed in Fig. 3, and the upper and lower edges thereof engage upper and lower shoulders 30 and 31, respectively, formed in the casting 11. The ring 28 is held firmly in place against the shoulders 30 and 31 by the inner ends of short bolts 33 which engage the front face of the ring 28.

The upper end of the bracket 26 is provided with a head 35 which is countersunk at either side to receive complemental cone points on screws 36 serving as a pivot for the bracket 26. The screws 36 are threadedly mounted in bosses 39 and are provided with lock nuts 36N.

A threaded portion 40, Fig. 3, is formed at the upper end of the bracket 26 at the medial point thereof. An adjusting screw 41 serving as a lever arm is threadedly mounted in the portion 40 so as to extend in a general front to rear direction at right angles to the pivot described above.

A dual-membered, dually settable counterweight having counterweights CW-1 and CW-2 is mounted on the lever arm 41. The counterweights CW-1 and CW-2 are locked against rotation on the arm 41 so as to be on opposite sides of the pivot 36. It will be observed in Fig. 3 that the setting there is one in which the screw 41 has been turned so that the counterweight CW-2 overbalances the counterweight CW-1 to hold the vane against the stop ring 28 when no air is flowing in the duct on which the present control is used.

Anchored as by screws 50 and 51 in position above the pivot 36 in the upper chamber 13 is a microswitch MS. The switch MS is of a conventional type and includes a highly sensitive contact arm in the form of a leaf spring 53 so tensioned that the lower end thereof engages a control arm 55 that is secured to the sleeve 35 of the bracket 26. Thus, the relation is such that the contact arm 53 is in the path of the arm 55 so that when the disc is pulled or shifted clockwise from an idle to an actuated position as viewed in Fig. 3, the holding force of the arm 55 is removed from the leaf 53 which then springs clockwise, Fig. 3, to operate the switch MS. It will be appreciated that such releasing of the leaf 53 upon a change in normal or operating pressure may be manifest either in a closing or opening of the switch MS, depending upon the control circuit in which the switch MS is associated and the type of equipment being controlled. It will also be recognized that other relations and positions between the control arm 55 and leaf spring 53 are possible to achieve specific actions.

So long as there is no air flow in the duct on which the control 10 is mounted, the counterweight CW-2 is effective to hold the control disc or vane 25 engaged with the ring 28. When air flow occurs, as by starting a fan operating in such duct, suction, that is negative pressure, is created in chamber 14 of the control, overbalancing the weight CW-2 and pulling the vane 25 clockwise as viewed in Fig. 3 against seats 30R and 31R that are spaced rearwardly of the shoulders 30 and 31. In so moving, the control arm 55 is relieved from the leaf 53 enabling the switch MS to operate. Should such suction, as at SU, Fig. 3, cease for some reason the control vane 25 will assume the idle position shown in Fig. 3, disabling the switch MS.

An ancillary advantage of the control of the present invention is that the wires associated with the switch MS will not tend to be fatigued or become tangled, inasmuch as there is no movement of the switch MS with or upon movement of the sensing means 25. Thus, the circuit wires as W extend from the switch MS to a terminal block 55, and leads (not shown) to the terminal block 55 are afforded through a conduit 56 threadedly mounted as shown in Fig. 3 in the upper wall of the housing 11.

The switch MS may assume different forms so far as the contacts therein are concerned. Thus, the switch MS may be a single throw, double pole switch so as to be capable of controlling two circuits, closing one while breaking the other. In devices of this kind which have heretofore used a mercury tube switch, such two circuit control has not been considered satisfactory because of the additional drag of the third wire, which is not of significance under the present invention.

To alter the control from a suction or negative pressure type to a positive pressure type, it is merely necessary to reverse the counterweight setting to the other of its dual positions whereat the counterweight CW-1 overbalances the weight CW-2 as shown in Fig. 4. This disposes the vane 25 in its other idle position with the upper and lower edges thereof in engagement with shoulders 30R and 31R, Fig. 4, that are spaced rearwardly of the shoulders 30 and 31 in the lower chamber 14 of the housing 11. Thus, in this instance, the vane 25 when the control is idle will be set against the shoulders 30R and 31R rather than the ring 28. Then, when air flow commences to establish positive pressure in the nipple 18 this will force the vane counterclockwise as viewed in Fig. 4 actuating the switch MS which may be modified accordingly. So long as positive pressure remains constant, switch MS will be held in its operative setting, but if pressure ceases for some reason the vane 25 will return to idle position disabling the switch MS.

Hence, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a control device of the kind described adapted to serve as a pressure-responsive control in a fluid system, means responsive to a predetermined change from normal in fluid pressure to move from an idle to an actuated position, means including a dual bodied counterweight adapted to bias the pressure responsive means in one of two idle positions, a micro-switch adjacent said pressure responsive means, and means operating between the micro-switch and the pressure responsive means to change the setting of said micro-switch upon movement of the pressure responsive means from normal to actuated setting.

2. In a control device of the kind described adapted to serve as a pressure-responsive control in a fluid system, sensing means responsive to a predetermined change from normal in fluid pressure to shift from an idle to an actuated position, said sensing means having two selectively different idle positions characterizing the control either as suction type or positive pressure type, means including a dual bodied counterweight adapted selectively to bias the sensing means in either of its two idle positions, said sensing means including a control element movable therewith, and a micro-switch having a contact arm located in the path of said control element so that said micro-switch is operated when said sensing means and the control element thereon shift from an idle to an actuated position.

3. In a control device of the kind described adapted to serve as a pressure-responsive control in a fluid system, sensing means in the form of a pivoted vane responsive to a predetermined change from normal in fluid pressure to shift from an idle to an acutated position, said vane having two selectively different idle positions on opposite sides of the pivot therefor characterizing the control either as a suction type or as a positive pressure type, means including a dual bodied counterweight selectively settable to bias the vane in either of its two idle positions, a micro-switch having a contact arm, and means acting between said vane and the contact arm of said switch to operate the switch when the change in fluid pressure is such that said vane shifts from an idle to an actuated position.

4. In a dually convertible pressure responsive control device of the kind described for either suction or positive pressure operation and being responsive to changes from normal in fluid pressure, a vane adapted to be exposed to the fluid, a pivot for the vane on which the vane is adapted to pivot from one idle position to an actuated position when there is a predetermined change in fluid pressure, said actuated position also being a second idle position upon conversion of the control, a pair of counterweights reversibly settable with respect to said pivot to hold the vane in one such idle position so long as the pressure of the fluid is at normal value, a micro-switch adjacent said vane and including a contact leaf for opening and closing the switch, and said vane including means to control said contact leaf upon movement of the vane between the respective positions thereof.

5. In a dually convertible control device of the kind described for either suction or positive pressure operation and being responsive to a change from normal in the pressure of a fluid body to operate a control circuit, a housing, a pressure-responsive vane in a chamber in said housing and means affording communication between said chamber and the body of fluid, a pivot for said vane in said housing enabling the vane to pivot from one idle position to an actuated position upon a change from normal in fluid pressure, said actuated position also being a second idle position upon conversion of the control, a lever arm carried by said vane and extending beyond said pivot on opposite sides thereof, a counterweight at each end of said lever arm and arranged normally to bias the vane in said one idle position, said lever being reversible so that the other counterweight thereon will normally bias the vane in the second of its idle positions, a control arm carried by the vane, and a micro-switch for said circuit mounted in said housing with a contact leaf thereof disposed in the path of said control arm so as to actuate the switch when the vane pivots from an idle to an actuated position upon a predetermined change from normal in fluid pressure.

No references cited.